United States Patent
Ogawa

Patent Number: 6,113,833
Date of Patent: Sep. 5, 2000

[54] SEGMENTED TOROIDAL CORE FOR MANUFACTURING PNEUMATIC TIRES

[75] Inventor: Yuichiro Ogawa, Fuchu, Japan

[73] Assignee: Bridgestone Corporation, Tokyo, Japan

[21] Appl. No.: 09/119,397

[22] Filed: Jul. 21, 1998

[30] Foreign Application Priority Data

Jul. 22, 1997 [JP] Japan ................................... 9-211291
Aug. 8, 1997 [JP] Japan ................................... 9-227553

[51] Int. Cl.[7] .................................................. B29D 30/12
[52] U.S. Cl. .......................... 264/326; 156/110.1; 425/56
[58] Field of Search ...................... 425/50, 56; 264/326; 156/110.1

[56] References Cited

U.S. PATENT DOCUMENTS

| | | | |
|---|---|---|---|
| 1,346,231 | 7/1920 | Midgley, Sr. et al. | 425/56 |
| 1,356,596 | 10/1920 | Brundage | 425/56 |
| 1,360,736 | 11/1920 | Ericson | 425/56 |
| 1,366,750 | 1/1921 | Smith et al. | 425/56 |
| 1,389,892 | 9/1921 | Midgley, Sr. | 425/50 |
| 1,392,347 | 10/1921 | Midgley | 425/50 |
| 1,396,217 | 11/1921 | Jones, Jr. | 425/50 |
| 1,529,654 | 3/1925 | Hurt | 425/56 |
| 1,551,014 | 8/1925 | Doak | 425/56 |
| 1,562,662 | 11/1925 | Stevens | 425/56 |
| 1,903,458 | 4/1933 | Johnson . | |
| 4,083,672 | 4/1978 | Vaishnav . | |
| 4,198,372 | 4/1980 | Calori | 425/56 |
| 4,248,287 | 2/1981 | Christman . | |

FOREIGN PATENT DOCUMENTS 0-481-805-A2  4/1992  European Pat. Off. .
B2-6-28863  4/1994  Japan .

*Primary Examiner*—James P. Mackey
*Attorney, Agent, or Firm*—Oliff & Berridge, PLC

[57] ABSTRACT

A segmented core (10) for manufacturing pneumatic tires includes a substantially toroidal core body (11) formed of a plurality of core segments (12) which are arranged in a circumferential direction in tight contact with each other. A sleeve (31) rotatably supporting a first connector member (33) at its one end is inserted into the core body (11) so that the first connector member (33) is engaged with the core body (11) on one side thereof. A second connector member (40) is then detachably connected to the sleeve (31) on its another end, and thereby brought into engagement with the core body (11) on another side thereof. An integral unit is formed by the sleeve (31), the first connector member (33) and the second connector member (40), which ensures that the core segments (12) are maintained firmly and reliably connected to each other during formation and vulcanization of a green tire supported on the core body (11).

7 Claims, 7 Drawing Sheets

FIG_3
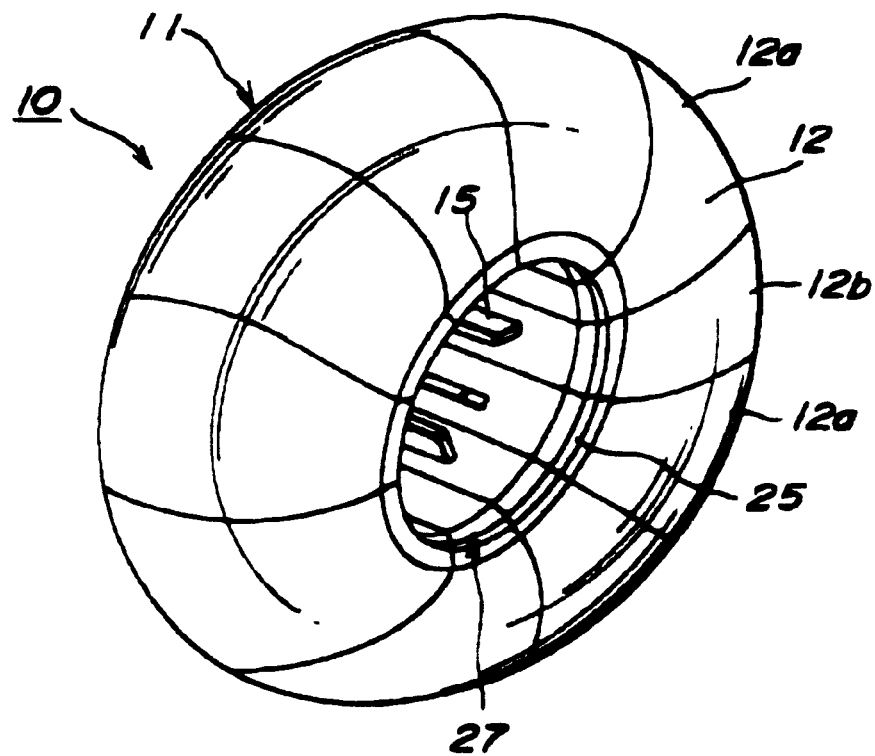
FIG_4
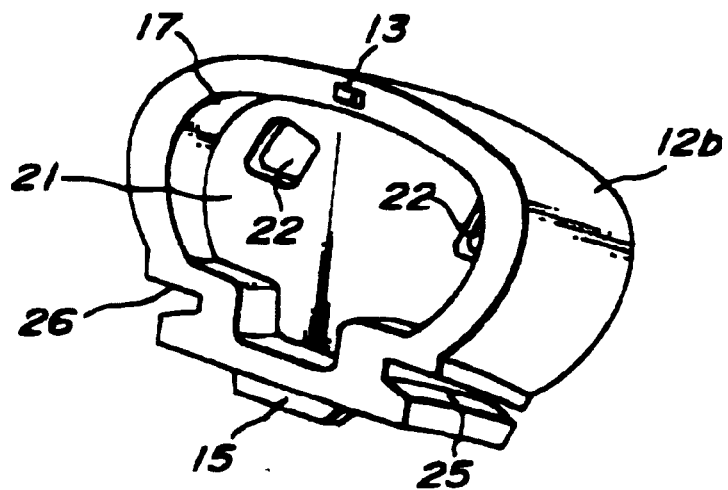

FIG._5
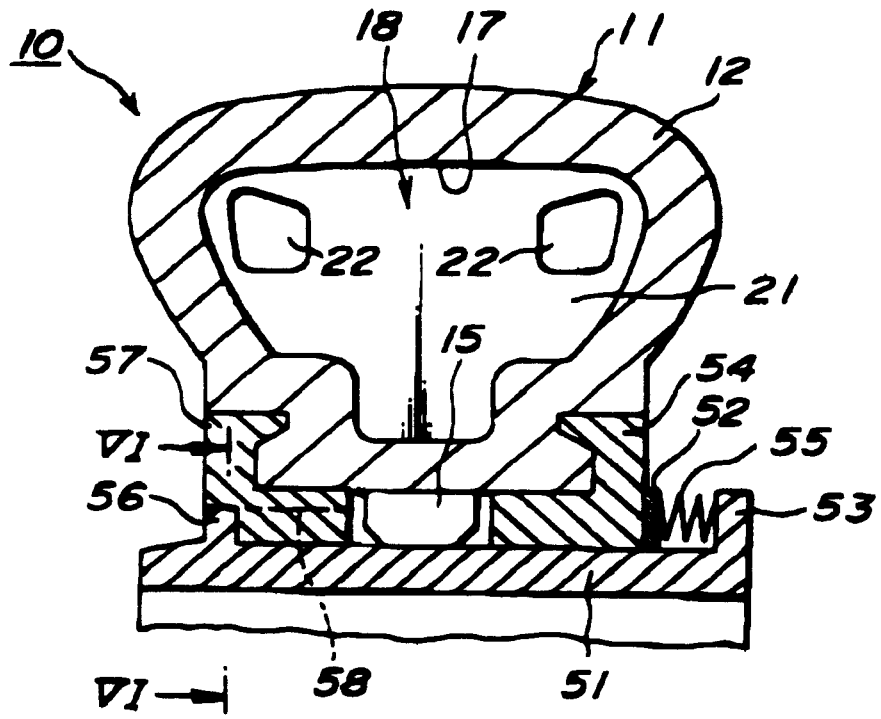
FIG._6
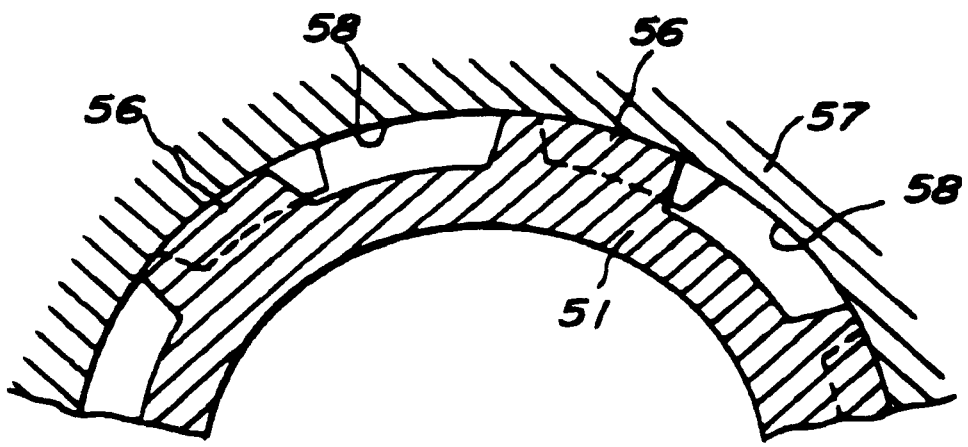

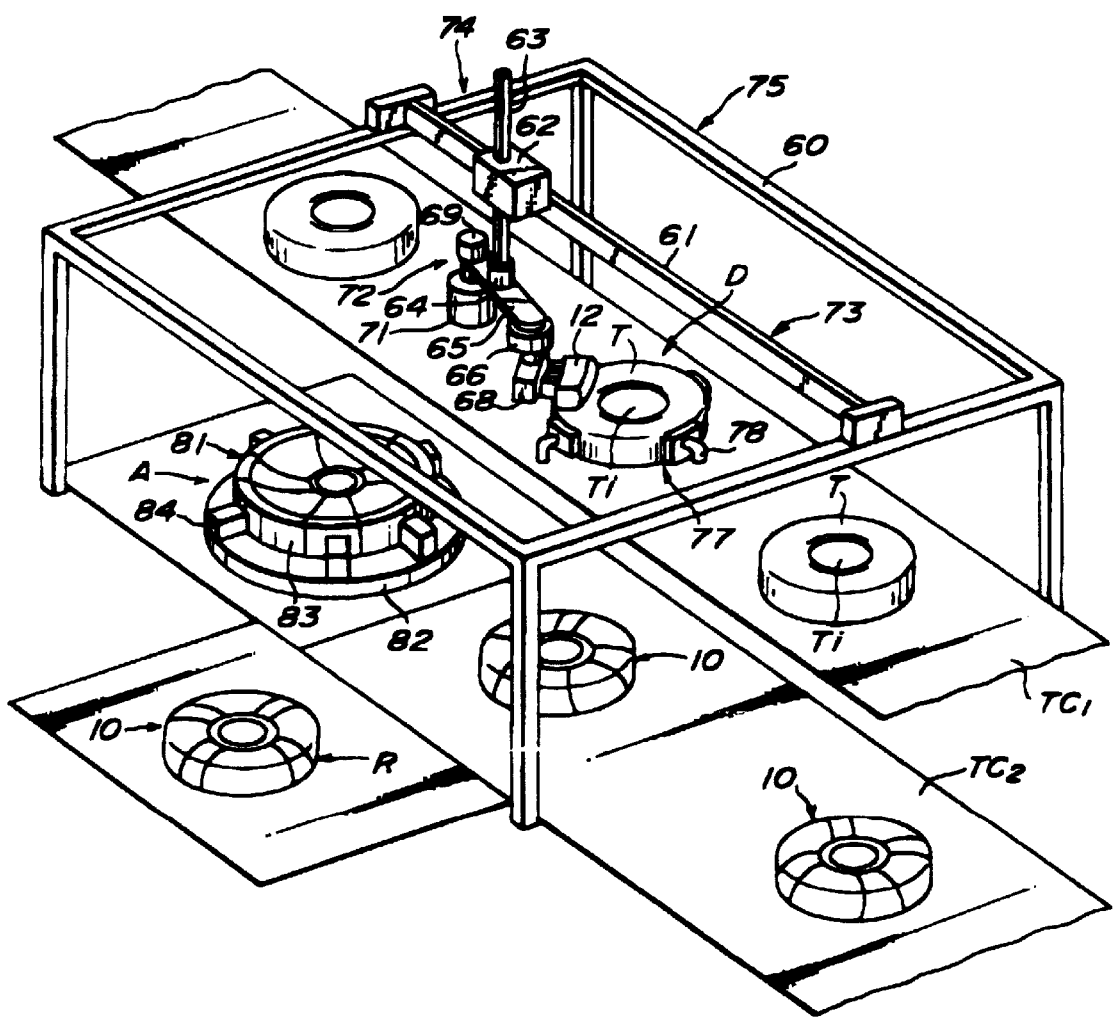
FIG_7

FIG_10
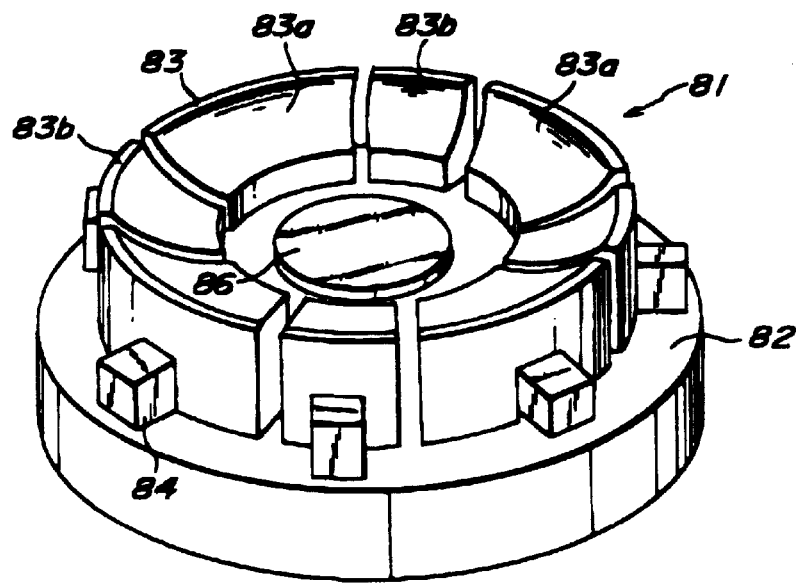
FIG_11
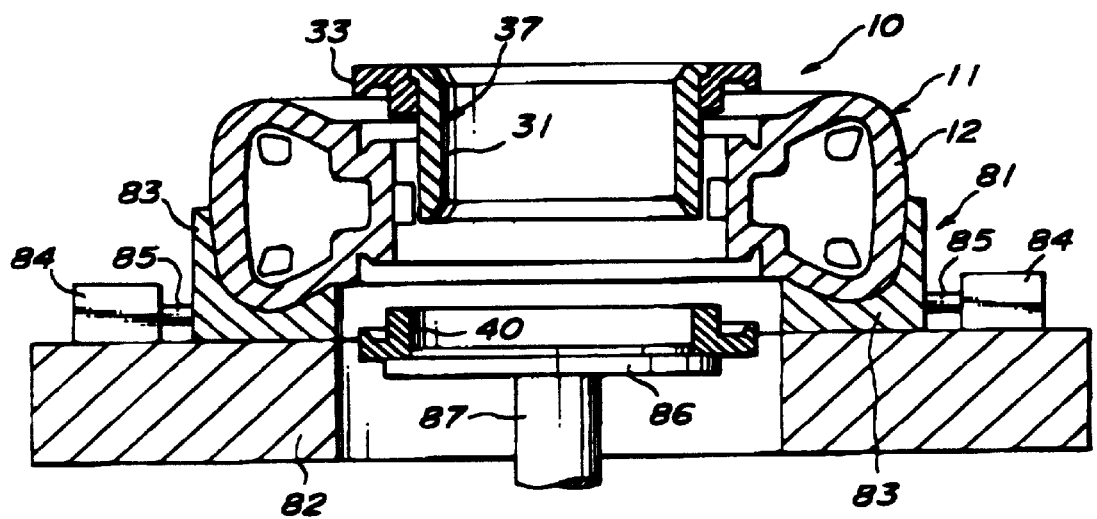

SEGMENTED TOROIDAL CORE FOR MANUFACTURING PNEUMATIC TIRES

BACKGROUND OF THE INVENTION

1. Field of the Invention

The present invention relates to a toroidal core for manufacturing pneumatic tires, which is used throughout formation of a green tire up to completion of its vulcanization.

2. Description of the Related Art

For manufacturing high performance pneumatic tires in a highly efficient and inexpensive manner, there has been proposed a method in which at least one rubber-coated cord is braided around a core which comprises a rigid body having a toroidal shape, so as to form at least one ply of radial carcass layer. Another rubber-coated cord is helically wound onto the radially outer side of the carcass layer so as to form at least one belt layer. A tread rubber in the form of unvulcanized rubber strip is wound onto the carcass layer and the belt layer to thereby form a green tire. Subsequently, the core together with the green tire supported thereon is transferred into a curing mold so as to perform vulcanization of the green tire.

According to the above-mentioned proposal, after vulcanization of the green tire has been completed, it is necessary to remove the core from the vulcanized tire. Thus, JP 6-28,863 B discloses a segmented toroidal core which is composed of a plurality of core segments. In this instance, when a green tire is to be formed on the core, the core segments are brought into tight contact with each other and arranged in the circumferential direction so as to form the toroidal core. The core segments are arranged so that they can be retracted radially inwards and sequentially removed from inside of the tire which has been subjected to vulcanization. There is a strong demand in the industry, for an improved segmented core for manufacturing pneumatic tires, which is highly suitable for practical use.

SUMMARY OF THE INVENTION

It is a primary object of the present invention to provide an improved segmented core in which the core segments can be maintained firmly connected to each other during formation and vulcanization of green tire, and removed from each other in a reliable and facilitated manner.

According to the present invention, there is provided a segmented core for manufacturing pneumatic tires, which comprises: a substantially toroidal core body comprised of a plurality of core segments which are circumferentially arranged side by side, in tight contact with each other; a substantially cylindrical sleeve which can be axially inserted into said core body in a coaxial relationship with respect to each other, said sleeve having first and second axial ends; a first connector member supported by said sleeve at said first axial end so as to be engageable with a radially inner portion of the core body on its one side; and a second connector member which can be detachably connected to the second axial end of said sleeve so as to be engaged with a radial inner portion of said core body on its another side, when the second connector member is connected to said sleeve.

With the segmented core according to the present invention, the core segments are arranged in a circumferential direction, in a predetermined order and tight contacted with each other to thereby form a substantially toroidal core body. The sleeve is then inserted axially into the core body so that the first connector member supported at the first axial end of the sleeve is engaged with a radially inner portion of the core body at one side thereof. The second connector member is then connected to the second axial end of the sleeve and engaged with a radially inner portion of the core body at the other side thereof. As a result, the first and the second connector members integrated with the sleeve serve to axially retain the core segments from both sides such that they are firmly fastened to each other by the connector members to stably support the green tire thereon during its formation and vulcanization. Furthermore, the core segments can be fastened to each other to form the core body simply by means of an integrated unit which is comprised of the first and the second connector members both connected to the sleeve, without requiring a complicated arrangement of the core as a whole.

According to the present invention, the first connector member may comprise an annular member which is axially retained, but rotatably supported at the first axial one end of the sleeve. Similarly, the second connector member may comprise an annular member which, in turn, is threadedly connected to the sleeve at the second axial one end thereof. In this instance, the core segments can be connected to each other in a facilitated and reliable manner, since the first and the second connector members both in engagement with the core segments can be kept stationary to stably maintain the predetermined positional relationship in the circumferential direction among the core body and the first and the second connector members.

Advantageously, the first and the second connector members are comprised of a material having a coefficient of thermal expansion which is smaller than that of the core body. In this instance, when the segmented core is placed in a curing mold and heated to a high temperature to perform vulcanization of the green tire, the first and the second connector members serve to more tightly fasten the core segments due to the difference in the coefficient of thermal expansion, so that the core segments can be maintained firmly fastened to each other, effectively preventing loosening despite the application of heat for vulcanization of the green tire.

Advantageously, the core segments are formed with interior spaces, respectively, which are in communication with each other to form a circumferentially continuous chamber inside of said core body, capable of being supplied with a heat medium. By this, the core body has a reduced thickness (hence, heat capacity) so that the heat from the heat medium can be rapidly conducted to the green tire, thereby shortening the vulcanization time.

In order to compensate for the reduced thickness and the resultant reduced mechanical strength of the core body, at least one reinforcement may be provided for each of the core segments, so as to extend substantially in a meridian plane which includes a center axis of the core body. At least one communication hole may be formed in the reinforcement, for allowing passage of said heat medium therethrough.

In the segmented core according to the present invention, adjacent core segments of the core body are in tight contact with each other at respective circumferential end surfaces which are opposite to each other. In order to allow a facilitated positioning of the core segments relative to each other, one of the circumferential end surfaces of the adjacent core segments may have a projection and the opposite circumferential end surface may have a recess for receiving the projection therein when the adjacent core segments are brought into contact with each other.

BRIEF DESCRIPTION OF THE DRAWINGS

The present invention will be more fully explained hereinafter, with reference to certain preferred embodiments illustrated in the accompanying drawings, in which:

FIG. 3 is a perspective view of the core body;

FIG. 4 is a perspective view of the parallel-sided core segment;

FIG. 5 is a sectional view showing a segmented core according to the second embodiment of the present invention;

FIG. 6 is a sectional view of the core as seen in the direction of arrow VI—VI in FIG. 5;

FIG. 7 is a perspective view showing a preferred embodiment of the system for assembling and disassembling the segmented core according to the present invention;

FIG. 10 is a perspective view showing the assembling stand for the segmented core; and FIG. 11 is a sectional view showing the assembling stand in use.

DESCRIPTION OF THE PREFERRED EMBODIMENT

Figure 1:
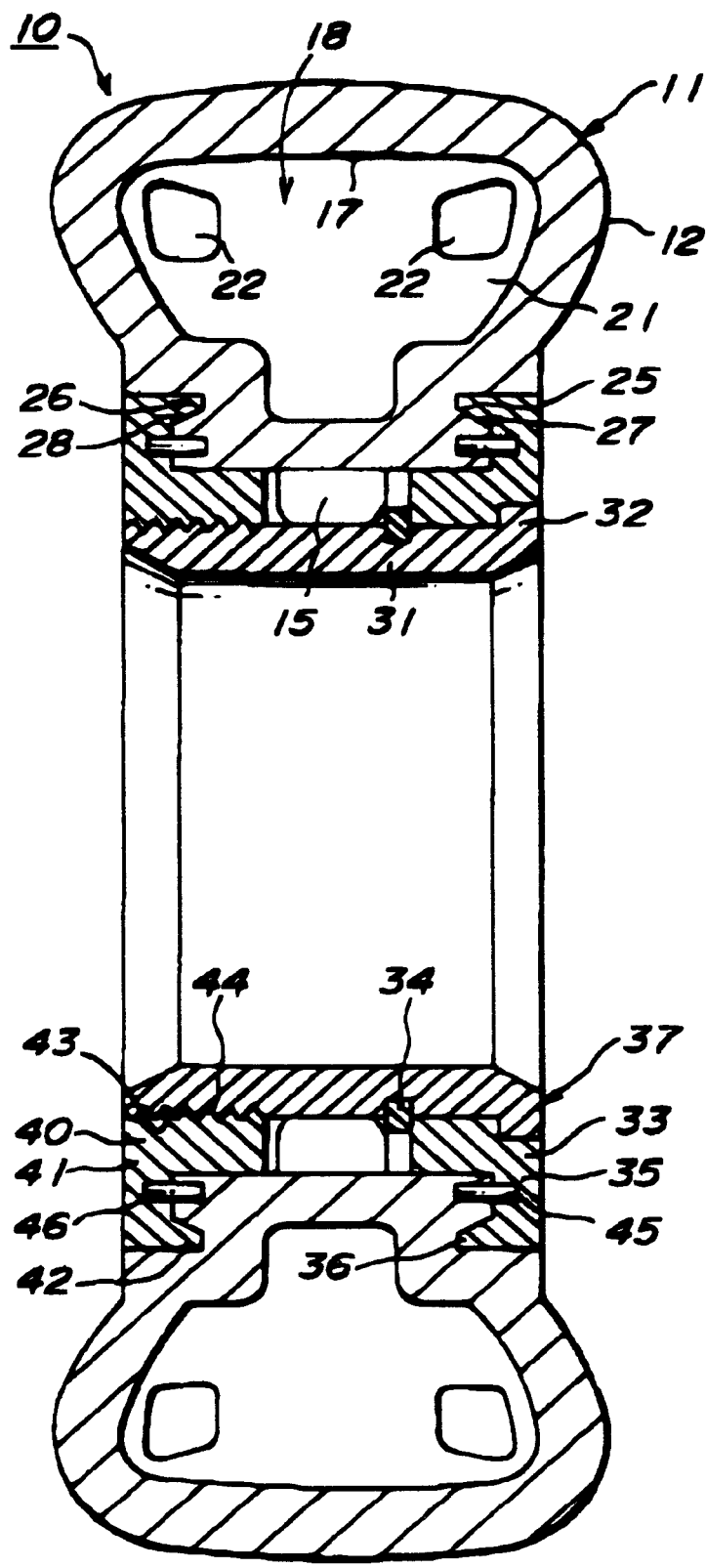
FIG. 1 is a sectional view showing a segmented core according to the first embodiment of the present invention.
Figure 2:
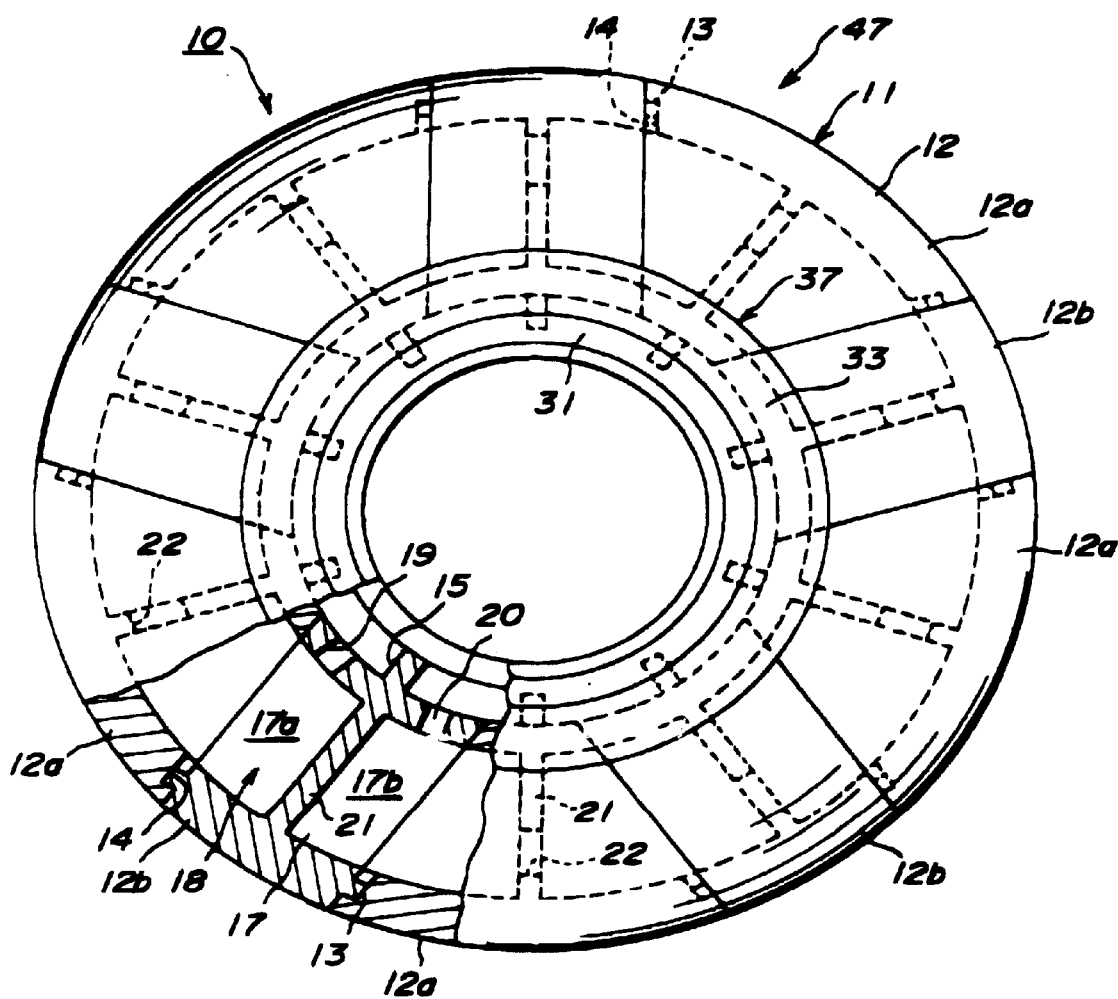
FIG. 2 is a partially broken side view of the core shown in FIG. 1.

Referring now to the drawings, in particular with reference to FIGS. 1 through 4, reference numeral 10 denotes a substantially toroidal core according to a first embodiment of the present invention, which includes a segmented core body 11 made, for example, of aluminum alloy. As noted above, at least one rubber-coated cord is braided on the outer surface of the core body 11 to form at least one ply of carcass layer, and unvulcanized rubber strips are wound onto the carcass layer as belt layers, and an unvulcanized tread rubber is then applied to form a green tire, The core 10, together with the green tire supported thereon, is transferred into a curing mold so that the green tire is heated and subjected to vulcanization to manufacture a pneumatic tire.

The core body 11 is comprised of a plurality of arcuate core segments 12, e.g., ten segments as in the illustrated embodiment, which are arranged in the circumferential direction in tight contact with each other. The core segments 12 include sector segments 12a having a circumferential length which increases radially outwards, and inverted segments 12b having a circumferential length which decreases radially outwards. The two types of the core segments 12a and 12b are alternately arranged in the circumferential direction of the core body 11, in tight abutment with each other.

Each circumferential end surface of the inverted segment 12b has a radially outer region which is provided with a projection 13 of a rectangular column shape. Similarly, each circumferential end surface of the sector segment 12a has a recesses 14 in the form of a radial slit which is adapted to receive the projection 13 therein. The provision of the projections 13 for the inverted segments 12b and the recesses 14 in the sector segments 12a, at their opposite circumferential end surfaces, serves to facilitate the assembly and disassembly of the core segments 12, since the projections 13 can be simply guided and properly positioned by the recesses 14. The engagement of the projections 13 and the recesses 14 further serves to effectively avoid undesirable dislocation of the segments 12 relative to each other, after the core segments 12 have been assembled.

When the core body II is to be disassembled and removed from the pneumatic tire after completion of vulcanization, the inverted segments 12b are moved radially inwards in the initial stage. In this connection, the recesses 14 are in the form of a slit which extends radially inwards up to the inner peripheral surface of the sector segment 12a. Thus, the movement of the projection 13 along the recess 14 is not impeded by the sector segment 12a.

For facilitating the assembly and disassembly of the core body 11, a tab 15 is provided on the inner peripheral surface of each core segment 12. The core body 11 can be assembled and/or disassembled by engaging the tab 15 with an appropriate mechanical means and thereby moving the core segment 12 radially outwards or inwards.

Each core segment 12 has an interior space 17 which is opened at both circumferential ends of the segment 12. Thus, when the core segments 12 are circumferentially disposed in tight contact with each other, the interior spaces 17 of the entire core segments 12 are brought into communication with each other to form an annular chamber 18 in the core body 11, which extends continuously in the circumferential direction. The annular chamber 18 can be supplied with a hot fluid, i.e. a heat medium for heating the green tire from the interior of the core body 11 during vulcanization. Thus, as particularly shown in FIG. 2, an inlet port 19 and an outlet port 20 are formed in the inner peripheral surface of one of the inverted segments 12b. The inlet port 19 and the outlet port 20 are communicated respectively with a supply source and a discharge reservoir, which are not shown, such that the heat medium is supplied into the chamber 18 via the inlet port 19 and discharged therefrom via the outlet port 20. Formation of the interior space 17 within each core segment 12, or of the annular chamber 18 within the core body 1, makes it possible to reduce the thickness, weight and heat capacity of the core body 11. Thus, during vulcanization of the green tire supported on the core body 11, the heat of the heat medium, which has been supplied to and circulated along the chamber 18, can be rapidly transferred to the green tire.

The interior space 17 of each core segment 12 is provided with a reinforcement 21 having an outer periphery connected to the inner surface of the core segment 12. The reinforcements 21 may be in the form of a partition wall extending in a meridian plane which includes the center axis of the core body 11, so that each interior space 17 is separated into two sub-spaces 17a and 17b. Despite partition of the interior space 17 by the reinforcement 21, the flow of the heat medium supplied to the chamber 18 should not be blocked by the reinforcement 21. Thus, the reinforcement 21 within each segmented core 12 may have at least one communication hole 22 for enabling the heat medium to flow through the annular chamber 18. It should be noted that the reinforcement 21 of that inverted segment 12b, which is formed with the above-mentioned inlet port 19 and outlet port 20, is free from the hole 22 and arranged between these ports 19, 20 so that the heat medium supplied via the inlet port 19 is discharged via the outlet port 20 after having substantially circulated through the annular chamber 18. Furthermore, by providing the interior space 17 of the core segment 12 with the reinforcement 21 which extends in the meridian plane of core body 11, the mechanical strength of the core body 11 having a reduced thickness can be improved to such an extent that the formation and vulcanization of a green tire can be sufficiently performed.

Moreover, each core segment 12 has arcuate groove sections 25, 26 in the radially inner regions on its opposite axial end surfaces. When the core body 11 is assembled, the groove sections 25 of adjacent core segments 12 are aligned in the circumferential direction to form a continuous circumferential groove 27 on one side of the core body 11, and the groove sections 26 of adjacent core segments 12 are aligned in the circumferential direction to form a continuous circumferential groove 28 on the other side of the core body 11.

In order to maintain the core body 11 in its assembled state, there is provided a cylindrical sleeve 31 which is formed with an annular ridge 32 at its one axial end. A first connector body 33 in the form of an annular ring body is fitted onto the outer side of the sleeve 31 and rotatably supported at the axial end region of the sleeve 31 adjacent to the annular ridge 32. The connector body 33 is axially retained from both sides by the annular ridge 32 and a retainer ring 34 which is fitted onto the outer surface of the sleeve 31, so as to prevent axial dislocation of the connector body 33 relative to the sleeve 31. The connector body 33 has an outer flange portion 35 at its one axial end which is formed with an annular projection 36 projecting axially toward the core body 11. The connector body 33 is engaged with the radially inner region of the core body 11 on its one side, by fitting the annular projection 36 into the circumferential groove 27. The sleeve 31 and the connector body 33 as a whole constitute a sub-unit 37 of substantially cylindrical shape, in which the connector body 33 on its one axial end is engaged with the radially inner portion of core body 11 on its one side. The sleeve 31 of the sub-unit 37 is inserted, from one side, into the center opening of the core body 11, in a coaxial relationship therewith.

The sub-unit 37 is further combined with another connector body 40, i.e. a second connector body, which is also in the form of an annular ring body. The connector body 40 has an outer flange portion 41 at its one axial end which is formed with an annular projection 42 projecting axially toward the core body 11. The connector body 40 is formed with a female screw 43 at the inner periphery thereof, while a corresponding male screw 44 is formed on the outer periphery of the sleeve 31 at its axial end which is remote from the connector body 33. By threadedly engaging the male screw of the sleeve 31 into the female screw 43 of the connector body 40, the connector body 40 is detachably connected to the sleeve 31 of the sub-unit 37. Further, when the connector body 40 is connected to the sub-unit 37 in a manner described above, the annular projection 42 of the connector body 40 is fitted into the circumferential groove 28 of the core body 11 so that the connector body 40 is engaged with the radially inner portion of the core body 11 on the other side.

The sleeve 31 and the connector bodies 33, 40 are preferably formed of a material (e.g., steel) having a coefficient of thermal expansion which is smaller than that of the core body 11. In this instance, when the temperature of the core body 11 is raised during vulcanization, the connector bodies 33, 40 exert an increased clamping force to the core body 11 from both sides thereof, to ensure connection therebetween and prevent leakage of heat medium.

On one side of the core body 11, positioning pins 45 are arranged near the arcuate groove sections 25, and inserted into each core segment 12 and the outer flange portion 35 of the connector body 33. Similarly, on the other side of the core body 11, positioning pins 46 are arranged near the arcuate groove sections 26, and inserted into each core segment 12 and the outer flange portion 41 of the connector body 40. These positioning pins 45 and 46 serve to maintain predetermined angular relationship between the core body 11 and the connector bodies 33, 40. As explained above, the connector body 33 is rotatably supported at one axial end of the sleeve 31, and the connector body 40 is threadedly connected to the other end of the sleeve 31 by means of the female screw 43 and the male screw 44. It is therefore possible to perform fastening of the core segments 12 relative to each other and connection of the core body 11 to the connector bodies 33, 40 in a reliable and facilitated manner, simply by the rotation of the sleeve 31 only, while maintaining the above-mentioned predetermined angular relationship therebetween. The core body 11, the sleeve 31 and the connector bodies 33, 40 collectively constitute the segmented core 10 as a whole.

The operation of the toroidal core according to the above-mentioned embodiment will be explained below.

In order to assemble the above-mentioned segmented core 10, the core segments 12 are arranged in the circumferential direction in a predetermined order, in tight contact with each other, so as to form the core body 11. On this occasion, by using the projections 13 and recesses 14 as guides, the adjacent core segments 12 can be readily placed into a prescribed positional relationship, so that the assembling operation of the core body 11 becomes easy and precise. The sleeve 31 of sub-unit 37 is then axially inserted into the center opening of the core body 11 from one side, while maintaining the coaxial relationship with respect to the core body 11. On this occasion, the annular projection 36 of the connector body 33 rotatably supported on the sleeve 31 is fitted into the circumferential groove 27 on one side of the core body 11, and the axial end of sub-unit 37 is engaged with the radially inner portion of the core body 11 at its one side. Also, the positioning pins 45 on one side of the core body 11 are inserted into the connector body 33 and the core body 11, so that the predetermined angular relationship between the core body 11 and the connector body 33 is assured. Then, the positioning pins 46 on the other side of the core body 11 are inserted into the other connector body 40 and the core body 11, so that the predetermined angular relationship between the core body 11 and the connector body 40 is assured. The annular projection 42 of the connector body 40 is fitted into the circumferential groove 28 of the core body 11 so that the connector body 40 is engaged with the radially inner portion of the core body 11 at the other side thereof. The sleeve 31 is then rotated, with the male screw 44 being threaded into the female screw 43, so that the connector body 40 is connected to another axial end of the sleeve 31, while maintaining the above-mentioned angular relationship between the core body 11 and the connector bodies 33, 40. As a result, the connector body 40 is integrated with the sub-unit 37 which comprises the sleeve 31 and the connector body 33. Since the connector bodies 33, 40 are engaged with the radially inner portions of the core segments 12 on their both sides, the core segments 12 are firmly and positively fastened to each other to form a toroidal core 10 which can be reliably used for formation and vulcanization of green tire. Furthermore, the fastening of the core segments 12 relative to each other can be effected only by the sleeve 31 and the connector bodies 33, 40, so that the entire structure of the segmented core 10 is simplified.

When the segmented core 10 has been assembled as described above, the main shaft of a tire building machine (not shown) is inserted into the sleeve 31 and connected thereto, a rubber-coated cord and rubber strips are braided and wound on the outer peripheral surface of the core body 11, respectively, to form a green tire. The segmented core 10 is then removed from the tire building machine and transferred together with the green tire into a curing mold, not shown. In this connection, the inner periphery of the sleeve 31 may be formed with an engaging ring which can be engaged by an appropriate loader so as to transfer the segmented core 10 together with the green tire supported thereon. The annular chamber 18 within the core body 11 is supplied with a heat medium via the inlet port 19, so that the heat medium flows through the chamber 18 while successively passing through the holes 22 in the reinforcements 21, and is discharged via the outlet port 20. Due to the passage of the heat medium along the annular chamber 18, the heat medium accelerates the vulcanization of the green tire around the thin-walled core body 11, to thereby form a pneumatic tire. During the vulcanization, the core body 11 and the connector bodies 33, 40 are heated to a high temperature. However, as mentioned above, the sleeve 31 and the connector bodies 33, 40 are made of a material having a coefficient of thermal expansion which is smaller than that of the core body 11. Thus, the connector bodies 33, 40 serve to firmly clamp the core body 11 from both sides thereof, with an increased clamping force, to ensure the fastening therebetween and prevent leakage of the heat medium.

During formation and vulcanization of the green tire on the core body 11, a substantial force is exerted to the core body 11, which tends to deform the core body 11. However, such deformation can be effectively avoided, since each core segment 12 has reinforcement 21 therein.

After completion of vulcanization of the green tire in the manner as described above, the core 10 is removed from the curing mold and then disassembled and removed from the tire. In this instance, the sleeve 31 is rotated in a reverse direction to disconnect the connector body 40 from the sleeve 31, and the sub-unit 37 including the sleeve 31 and the connector body 33 is axially removed from the core body 11. The inverted segment 12b is then moved radially inwards by pulling the tab 15 thereon. At this time, as explained above, each recess 14 extends radially inwards up to the inner surface of the core body 11, so that the sector segment 12a does not impede the movement of the projection 13. The inverted segment 12b is removed from the tire by an axial movement of the segment 12b. Thereafter, the remaining inverted segments 12b and sector segments 12a are removed from the tire in the same manner as above.

A segmented core according to a second embodiment of the present invention is shown in FIGS. 5 and 6. In this embodiment, a sleeve 51 has an axial end portion with an outer surface on which an axially movable slide ring 52 is fitted. A compression spring 55 is arranged between a flange 53 at the end of the sleeve 51 and the slide ring 52, for urging the slide ring 52 toward a first connector body 54 in the form of an annular body. A plurality of arcuate projections 56 separated from each other in the circumferential direction are formed on the outer surface of the sleeve 51 at the other axial end thereof. A plurality of arcuate slits 58 separated from each other in the circumferential direction are formed in the inner peripheral surface of the second connector body 57 in the form of an annular body. Thus, when the core segments 12 constituting the core body 11 are connected to each other by such sleeve 51 and the first and second connector bodies 54, 57, these connector bodies 54, 57 are engaged with the core body 11 and the sleeve 51 is axially moved against the spring 55 in such a state that the arcuate projections 56 are fitted or overlapped with the arcuate slits 58, respectively. After the arcuate projections 56 have passed axially through the arcuate slits 58, the sleeve 51 is rotated by a predetermined angle such that the arcuate projections 56 are overlapped with those portions of the second connector body 57 which are between the slits 58, respectively. By stopping the application of the external force to the sleeve 51 in this situation, the arcuate projections 56 are pressed onto the radially inner portions of the second connector body 57 by the spring 55, so that the core segments 12 are fastened to one another. In case of disassembling the segmented core, the above-mentioned steps are performed in opposite order. Other constitution and operation of the second embodiment are essentially same as those of the first embodiment.

A preferred embodiment of the system for assembling and disassembling the segmented core according to the present invention is shown in FIG. 7. The system includes a rectangular frame 60 and a transfer conveyor $TC_1$ which extends through the frame 60 in its lower portion. A plurality of pneumatic tires T are supported on the conveyor $TC_1$ horizontally, with the segmented cores 10 being accommodated in the interior space Ti of the tire T. These tires T are intermittently transferred in the predetermined direction by the conveyor $TC_1$, by means of an appropriate driving means, such as an electric motor (not shown).

Figure 8:
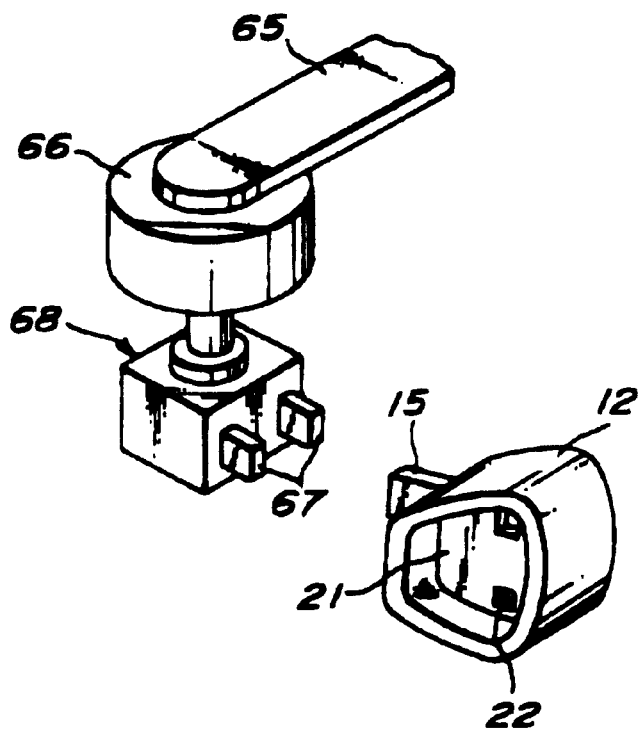
FIG. 8 is a perspective view showing the clamping device for the core segment.
Figure 9:
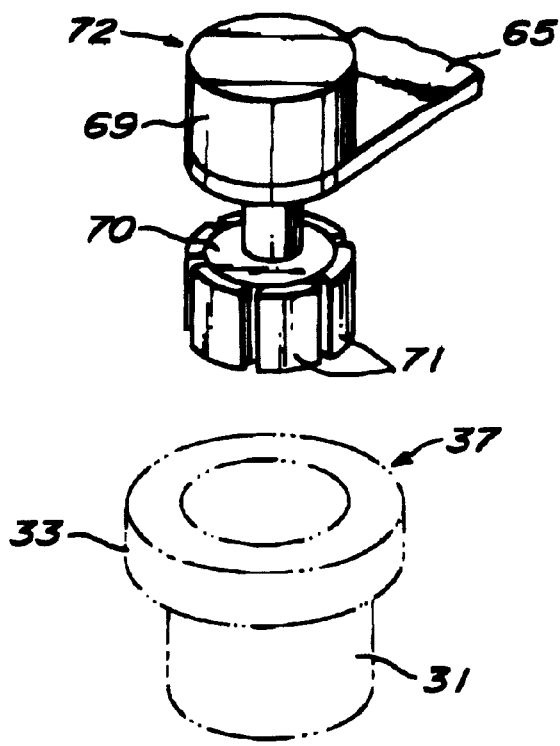
FIG. 9 is a perspective view showing the rotary drive for the sleeve.

As shown in FIGS. 7, 8 and 9, a movable beam 61 extending horizontally in the longitudinal direction of the transfer conveyor $TC_1$ is supported on the upper portion of the frame 60. The beam 61 is driven by a driving means, such as an electric motor, in a horizontal direction perpendicular to the longitudinal direction of the transfer conveyor $TC_1$, i.e., transversely thereto. A movable carriage 62 is supported on the beam 61 and driven by a driving means, such as an electric motor, along the beam 61 in the longitudinal direction of the transfer conveyor $TC_1$. A vertical rod 63 is passed through the carriage 62 and raised or lowered by a driving means, such as a cylinder/piston device, not shown. A swiveling device 64 comprising an electric motor or rotary actuator is secured to the lower end of the rod 63, and has an output shaft to which a center portion of a supporting arm 65 is connected. The arm 65 extends in a horizontal plane, which is parallel to the equatorial plane of the tire T horizontally laid on the transfer conveyor $TC_1$, and undergoes a swiveling motion in the horizontal plane as the swiveling device 64 is operated.

As particularly shown in FIG. 8, one end portion of the arm 65 supports a rotary drive mechanism 66 comprising an electric motor or rotary actuator and having an output shaft to which a clamping device 68 is secured. The clamping device 68 includes a pair of clamping jaws 67 which can be opened or closed by an electric motor or a link mechanism and which serve to clamp the tab 15 of the core segment 12. Furthermore, as particularly shown in FIG. 9, the other end portion of the arm 65 supports a rotary drive mechanism 69 comprising an electric motor or rotary actuator and having an output shaft to which a rotary block 70 is secured. The rotary block 70 has a plurality of catches 71 which are spaced from each other in the circumferential direction. The catches 71 have a cylindrical contour as a whole and are arranged such that they can be radially expanded or contracted by a drive means therefor.

As will be apparent from the following description, the rotary drive mechanism 69, the rotary block 70, the catches 71 and the drive means therefor as a whole constitute a disengaging means 72 for disengaging the core segments 12 from each other by disengaging the connector body 40 from the core body 11. The movable beam 61, the carriage 62 and the drive means therefor as a whole constitute a first moving means 73 for moving the supporting arm 65, the clamping device 68 and the disengaging means 72 in a plane which is parallel to the equatorial plane of the tire T. i.e., in the horizontal plane in the illustrated embodiment. The vertical rod 63 and the drive means therefor as a whole constitute a second moving means 74 for moving the supporting arm 65, the clamping device 68 and the disengaging means 72 in the axial direction of the tire T. Finally, the supporting arm 65, the clamping device 68, the disengaging means 72, the first moving means 73 and the second moving means 74 as a whole constitute the system for assembling and disassembling the segmented core according to the present invention.

A disassembling station D is arranged on the transfer conveyor $TC_1$. When a tire T is transferred to the disassembling station D, the transfer of the tires T is stopped for a period in which the segmented core is removed from the tire T. The disassembling station includes a clamping device 77 which is arranged so as to be moved vertically. The clamping device 77 includes a plurality of clamp members 78 which are spaced from each other in the circumferential direction. As a tire is transferred to the disassembling station D, the clamping device 77 is raised so that the tread portion of the tire T is engaged by the clamp members 78 and fixedly hold the tire T to the disassembling station D.

With reference to FIGS. 7, 10 and 11, an assembling station A is arranged on one side of the disassembling station D and provided with an assembling means 81. The assembling means 81 includes an annular base member 82 and a plurality of arcuate supporting segments 83 on the base member 82, which are spaced from each other in the circumferential direction and the number of which corresponds to that of the core segment 12. Like the core segment 12, the supporting segments 83 comprise sector segments 83*a* and inverted segments 83*b*, which are alternately arranged in the circumferential direction. The sector segments 83*a* and the inverted segments 83*b* have depressed upper surfaces for supporting the sector core segments 12*a* and the inverted core segments 12*b* thereon, respectively. A plurality of cylinder devices 84 are arranged on the upper surface of the base member 82, on the radially outer side of the supporting segments 83. Each cylinder device 84 has a piston rod 85 having a tip end which is connected to the supporting segment 83. When the cylinder devices 84 are operated and the piston rods 85 are extended, with the core segments 12 supported on the supporting segments 83, the supporting segments 83 are synchronously moved radially inwards to bring the core segments 12 in tight contact with each other A disc-like supporting plate 86 is arranged in the center portion of the base member 82, for supporting the second connector body 40 thereon. The supporting plate 86 is connected to the upper end of a piston rod 87 of a cylinder device which extends in the vertical direction. The base member 82, supporting segments 83, the cylinder device 84, the supporting plate 86 and the cylinder device for the supporting plate constitute as a whole the above-mentioned assembling means 81. Incidentally, the assembling station A may be provided with a plurality of assembling means for assembling different segmented cores corresponding to different specifications of tires, such as different tire sizes.

Another transfer conveyor $TC_2$ is arranged behind the assembling station A, which is driven by a driving mechanism, such as an electric motor. The transfer conveyor $TC_2$ serves to for transfer segmented cores which have been assembled at the assembling station A. Furthermore, a reserve station R is arranged on that side of the assembling station A which is opposite to the disassembling station D, for storing spare segmented cores which have been assembled at the assembling station A.

The operation of the above-mentioned system will be explained below, It is assumed that pneumatic tires T which have been subjected to vulcanization are transferred by the transfer conveyor $TC_1$, with the segmented cores accommodated in the interior space Ti of the tires T. When a tire T reaches the disassembling station D and the operation of the transfer conveyor $TC_1$ is temporarily stopped, the clamping device 77 is raised to a position around the tire T at the disassembling station D such that the tread portion of the tire T is engaged by the clamp members 78 and fixedly hold the tire T to the disassembling station D.

The movable beam 61 is moved transversely along the frame 60 while the carriage 62 is moved in the longitudinal direction along the beam 61 so as to transfer the disengaging means 72 at a position above the rotational axis of the tire T (or of the sleeve 31) at the disassembling station D. Then, the rod 63 is lowered together with the disengaging means 72 so that the disengaging means 72 is inserted into the sleeve 31, and the catches 71 are synchronously expanded radially outwards so that the catches 71 clamps the sleeve 31 from inside. In such a state, the rotary drive mechanism 69 is operated to rotate the rotary block 70 and the catches 71 in a direction in which the male screw 44 of the sleeve 31 is disengaged from the female screw 44 of the second connector body 40, so that the sub-unit 37 comprising the sleeve 31 and the first connector body 33 is disengaged from the second connector body 40. During this disengagement, the disengaging means 72 is slightly lifted, though such a lifting motion can be absorbed by a corresponding lifting motion of the rod 63.

The rod 63 is then lifted so that the disengaging means 73 clamping the sub-unit 37 is moved away from the tire T and the core body 11, and the movable beam 62 and the carriage 63 are moved to transfer the disengaging means 72 to a position above the assembling means 81 at the assembling station A. In this instance, it is assumed that the core segments which have been disassembled by the previous disassembling operation are supported on the supporting segments 83 of the assembling means 81 in tight contact with each other, and the second connector body 40 is supported on the supporting plate 86 with the annular projection 42 of the connector body 40 fitted into the circumferential groove 28 of the core body 11. The rod 63 and the disengaging means 72 are lowered so that the sub-unit 37 is inserted into the center opening of the core body 11, and the rotary drive mechanism 69 is operated to rotate the sleeve 31 so that the male screw 44 of the sleeve 31 is engaged with the female screw 44 of the second connector body 40. By this, the second connector body 40 is connected to the sub-unit 37 and the annular projection 36 of the first connector body 33 is fitted into the circumferential groove 27 of the core body 11 so as to complete assembly of the segmented core 10. During this assembling operation, the disengaging means 72 is slightly lowered, though such a lowering motion can be absorbed by a corresponding lowering motion of the rod 63. In this way, the illustrated system can be used not only for the disassembly of the segmented core 10, but also for the assembly thereof.

The segmented core 10 assembled as above is transferred from the assembling station to the transfer conveyor $TC_2$ by lifting the rod 63 and moving the beam 61 and the carriage 62, and further transferred by the conveyor $TC_2$ to a tire building machine. The segmented core 10 which has been once heated to high temperature during the previous vulcanization is sufficiently cooled during the assembling operation at the assembling station A and also during the transfer along the conveyor $TC_2$, so that it can be used for formation of a new green tire as it is. After the segmented core 10 is removed from the assembling means 81, the cylinder devices 84 of the assembling means 81 are operated to retract the respective piston rods 85 so that the supporting segments 83 are synchronously moved radially outwards to form circumferential gaps therebetween. This is for avoiding interference of adjacent core segments 12 by the mating projections 13, when the core segments 12 are placed onto the supporting segments 83.

The clamping device 68 is then returned to a position on one side of the disassembling station D to remove the tire T from the disassembling station D while leaving the second connector body 40 at the disassembling station D. The movable beam 61 and the carriage 62 are moved and the rod 63 is lowered so that the disengaging means 72 is inserted into the second connector body 40 to clamp the same from inside. The rod 63 is then lofted and the movable beam 61 and the carriage 62 are moved to transfer the second connector body 40 onto the supporting plate 86 of the assembling means 81. The clamping device 68 is then operated so that the tire T is returned to the disassembling station D. In this way, the disengaging means 72 ensures that the sub-unit 37 comprising the sleeve 31 and the first connector body 33 is removed from the core body 11 and transferred to the assembling means 81.

The swiveling device 64 is then operated to rotate the supporting arm 65 in a horizontal plane by 180 degrees about the center portion of the arm 65, for effecting a changeover between the disengaging means 72 and the clamping device 68. The provision of the clamping device 68 at one end of the arm 65 and the disengaging means 72 at the other end of the arm 65 is highly advantageous from practical viewpoints, since the changeover between the disengaging means 72 and the clamping device 68 can be effected efficiently by rotating the arm by 180 degrees, and the disengagement of the sub-unit 37 and from the core body 11 and removal of the core segments 12 can be carried out in a continuous manner.

The movable beam 61 and the carriage 62 are then moved to transfer the clamping device 68 to a position above the rotational axis of the tire T. The rotary drive mechanism 66 is then operated to rotate the clamping device 68 in a horizontal plane. Upon such rotation of the clamping device 68, a sensor (not shown) detects whether the core segment 12 below the clamping device 58 is a sector segment 12*a* or an inverted segment 12*b*. When it has been detected by the sensor that an inverted segment 12*b* is situated below the clamping device 58, the operation of the rotary drive mechanism 66 is stopped.

The vertical rod 63 is then lowered so that the clamping device 68 is inserted into the center opening of the tire T. In this instance, the tag 15 of the inverted segment 12*b* is positioned between the clamping jaws 67 in their opened state. The clamping jaws 67 are then closed to clamp the tag 15 of the inverted segment 12*b* from both sides, and the movable beam 61 and the carriage 62 are moved such that the supporting arm 65 and the clamping device 68 are moved in a horizontal plane radially inwards with respect to the tire T. As a result, the inverted segment 12*b* clamped by the clamping device 68 is withdrawn from the interior space Ti of the tire T to the center opening thereof.

The rod 63 is then lifted so that the supporting arm 65, the clamping device 68 and the inverted segment 12*b* are moved upwards, i.e., in the axial direction of the tire T. to thereby remove the inverted segment 12*b* from the tire. The movable beam 61 and the carriage 62 are then moved and the rod 63 is lowered to transfer the inverted segment 12*b* onto the corresponding supporting segment 83, i.e., the inverted supporting segment 83*b*.

The above-mentioned operations are repeated until the remaining inverted segments 12*b* are sequentially clamped by the clamping device 68 and transferred onto the supporting segments 83, and the sector segments 12*a* are then sequentially clamped by the clamping device 68 and transferred onto the supporting segments 83. Then, the piston rods 85 of the cylinder devices 84 are synchronously extended so that the core segments 12 supported on the supporting segments 83 are brought into tight contact with each other to form a toroidal core 10. Also, the piston rod 87 of the cylinder device is extended so that the annular projection 42 of the second connector body 40 is fitted into the circumferential groove 28 of the core body 11. The transfer conveyor $TC_1$ is then operated to transfer the tire T in the forward direction. The swiveling device 64 is operated to rotate the supporting arm 65 by 180 degrees for effecting changeover between the clamping device 68 and the disengaging means 72, The movable beam 61 and the carriage 62 are then moved and the rod 63 is lifted so that the clamping device 68 and the disengaging means 72 are returned to their initial positions.

As explained above, the illustrated system ensures that the sub-unit 37 comprising the sleeve 31 and the first connector body 33, the second connector body 40 and the core segments 12 are sequentially removed from the tire T and transferred to the assembling means so as to be assembled into the toroidal core. The system is simple and reliable in structure because the provision of the first moving means 73 for moving the supporting arm 65 and the clamping device 68 in the horizontal plane, and of the second moving means for moving the supporting arm 65 and the clamping device 68 in the axial direction of the tire ensures that the segmented core 10 can be positively removed from the interior space of the tire T. Moreover, the core segments can be disassembled simply by moving the supporting arm 65 and the clamping device 68 radially inwards with respect to the tire, and in the axial direction of the tire, so that the disassembly can be carried out in a highly efficient manner.

The system illustrated in FIGS. 7–11 may be modified such that the clamping device is maintained stationary while the tire T is rotated about its rotational axis, for positioning the to-be-clamped core segment relative to the clamping device 68. Also, it is not a prerequisite condition to use the movable beam 61, the carriage 62 and the driving means therefor, for transferring the removed core segments 12 to the assembling station A as part of the first moving means 73 for moving the clamping device 68 and the core segment 12 radially inwards and thereby removing the core segment from the tire T, as in the illustrated embodiment.

It will be appreciated from the foregoing description that the present invention provides an improved segmented core in which the core segments can be maintained firmly connected to each other during formation and vulcanization of green tire, and removed from each other in a reliable and facilitated manner.

While the present invention has been described above with reference to certain preferred embodiments, it is of course that various changes and modifications may be made without departing from the scope of the invention as defined by the appended claims.

What is claimed is:

1. A segmented core for manufacturing pneumatic tires, comprising:

a substantially toroidal core body that includes a plurality of core segments which, when the core body is assembled, are circumferentially arranged side by side, in tight contact with each other, each of the core segments having a radially inner portion, the radially inner portion having one side and another side that is axially opposite to the one side, each core segment defining an arcuate groove in the one and the other side of the radially inner portion, so as to form continuous circumferential grooves when the core body is assembled;

a substantially cylindrical sleeve which can be axially inserted into said core body in a coaxial relationship with respect to each other, said sleeve having first and second axial ends and an outer peripheral surface;

a first connector member supported by said sleeve at said first axial end so as to be engageable with the one side of the radially inner portion of the core body; and a second connector member which can be detachably connected to the second axial end of said sleeve so as to be engaged with the other side of the radial inner portion of said core body, when the second connector member is connected to said sleeve said second connector having an inner peripheral surface;

wherein the first connector member and the second connector member are provided with annular projections engageable with the circumferential grooves;

and wherein the inner peripheral surface of the second connector member is provided with a female screw, and the outer peripheral surface of the sleeve is provided with a corresponding male screw.

2. A segmented core according to claim 1, wherein said first connector member comprises an annular member which is axially retained but rotatably supported at said first axial end of said sleeve; and further including positioning pins between the one and the other side of the radially inner portion of each core segment and the first and second members, respectively, that maintain a predetermined angular relationship therebetween.

3. A segmented core according to claim 1, wherein said first connector member and said second connector member are comprised of a metal material having a coefficient of thermal expansion which is smaller than that of said core body.

4. A segmented core according to claim 1, wherein said core segments are formed with interior spaces, respectively, which are in communication with each other to form a circumferentially continuous chamber inside of said core body, capable of being supplied with a heat medium.

5. A segmented core according to claim 4 further comprising at least one reinforcement for each of said core segments, said reinforcement extending substantially in a meridian plane which includes a center axis of said core body, and having at least one communication hole for allowing passage of said heat medium therethrough.

6. A segmented core according to claim 1, wherein adjacent core segments of said core body are in tight contact with each other at respective circumferential end surfaces which are opposite to each other, one of said end surfaces having a projection and the other of said end surfaces having a recess for receiving therein said projection when the adjacent core segments are in contact with each other.

7. A method of manufacturing a pneumatic tire, which comprises the steps of:

forming a green tire on a segmented core according to claim 1; and placing said segmented core into a curing mold, together with the green tire supported thereon, to subject the green tire to vulcanization and thereby form a pneumatic tire.

* * * * *